(12) United States Patent
Lesieur et al.

(10) Patent No.: US 6,210,821 B1
(45) Date of Patent: Apr. 3, 2001

(54) SYSTEM FOR IMPLEMENTING OPERATION AND START-UP OF A VEHICLE WHICH IS POWERED BY ELECTRICITY FROM A FUEL CELL POWER PLANT

(75) Inventors: Roger R. Lesieur, Enfield; Leonard J. Bonville, Jr., Marlbrough; Jay Garow; Thomas J. Corrigan, both of Vernon; John L. Preston, Jr., Hebron, all of CT (US)

(73) Assignee: International Fuel Cells CO, LLC, So. Windsor, CT (US)

( * ) Notice: Subject to any disclaimer, the term of this patent is extended or adjusted under 35 U.S.C. 154(b) by 0 days.

(21) Appl. No.: 09/221,428

(22) Filed: Dec. 28, 1998

(51) Int. Cl.[7] ................................................ H01M 8/06
(52) U.S. Cl. ............................ 429/17; 429/20; 180/65.3
(58) Field of Search ............................. 502/406; 429/17, 429/20, 26, 120; 180/65.3

(56) References Cited

U.S. PATENT DOCUMENTS

| | | | |
|---|---|---|---|
| 3,982,962 | * 9/1976 | Bloomfield | 429/20 |
| 4,376,097 | * 3/1983 | Emelock | 429/17 X |
| 4,592,829 | * 6/1986 | Eberly | 502/406 |
| 4,994,331 | * 2/1991 | Cohen | 429/17 |
| 5,158,841 | * 10/1992 | Mennicke et al. | 429/120 |
| 5,290,641 | * 3/1994 | Harashima | 429/17 |
| 5,688,740 | * 11/1997 | Bolshakov et al. | 502/326 |
| 5,928,805 | * 7/1999 | Singh et al. | 429/17 X |

* cited by examiner

Primary Examiner—Stephen Kalafut
(74) Attorney, Agent, or Firm—William W. Jones

(57) ABSTRACT

A fuel gas processing system is operable to remove substantially all of the sulfur present in a hydrocarbon fuel supply used to power a fuel cell power plant in a mobile vehicular environment. The power plant fuel can be gasoline, diesel fuel, kerosene, fuel oil, natural gas, or another fuel which contains relatively high levels of organic sulfur compounds such as mercaptans, sulfides, disulfides, and the like. The hydrocarbon fuel supply is passed through a nickel reactant desulfurizer bed wherein essentially all of the sulfur in the organic sulfur compounds react with the nickel reactant, and are converted to nickel sulfide while the desulfurized fuel continues through the remainder of the fuel processing system. The fuel cell power plant and the processing system can be used to power a mobile vehicle, such an automobile, truck, bus, or the like. An auxiliary supply of hydrogen is provided in order to power the fuel cell power plant during start up of the fuel processing system. A second auxiliary supply of desulfurized fuel is also provided to operate the fuel cell power plant during an interim period until the highest temperature component of the fuel processing system is brought up to operational temperatures during the start up protocol.

13 Claims, 4 Drawing Sheets

SYSTEM FOR IMPLEMENTING OPERATION AND START-UP OF A VEHICLE WHICH IS POWERED BY ELECTRICITY FROM A FUEL CELL POWER PLANT

TECHNICAL FIELD

The present invention relates to an improved system for use in a fuel cell power plant assembly which is used to power a vehicle. More particularly, the system of this invention allows the fuel cell power plant assembly to be used to enable the vehicle to be started up without undue delay.

BACKGROUND OF THE INVENTION

Assemblies of fuel cells, called cell stack assemblies (CSA), have been used for some time as power sources for stationary fuel cell power plants in units such as ONSI's PC25 power plant; and they have also been used as power sources in space for NASA's Space Shuttle orbiter vehicle which is powered by International Fuel Cells Corporation's PC17 power plant. In view of their size, weight and/or cost, neither of these units is adaptable for use in a mobile vehicle application; however experimental units are being developed for use in mobile vehicles that will meet the size, weight and cost requirements and will also run on a reformable fuel, such as gasoline, diesel fuel, or the like.

A primary operating parameter that must be addressed in the use of a fuel cell power plant in a mobile vehicle is the start-up sequence. For example, the aforesaid PC25 power plant requires about three hours to achieve startup conditions; while the orbiter PC17 unit requires less than an hour to achieve startup conditions. Neither of these startup time requirements is acceptable for a mobile vehicle application. A fuel cell powered mobile vehicle must be able to be started as easily as an internal combustion engine-powered vehicle, which is ready to operate as soon as the ignition is turned on. Thus, the development of a system with instant ignition response at vehicle start-up is a necessary objective for a fuel cell power plant system that is able to be used to power a conventional mobile vehicle, such as an automobile, bus, truck, or an aquatic vehicle such as a boat.

The fuel cell CSA of a fuel cell power plant, especially a PEM type fuel cell which operates at relatively low temperatures, can be designed to deliver startup power evenly before achieving full CSA operating temperatures. Yet, to have a fuel cell powered vehicle system that runs on reformate gas operate instantly at start-up, one needs a system operating method for the initial transient time required to start the fuel processing unit. The key elements of the fuel processing unit, i.e., the sulfur scrubber and reformer, take a finite amount of time to be raised to their predetermined operating temperatures, while at the same time, the vehicle is required to operate according to the driver's demands without delay. One approach followed by some experimental developers is to eliminate the fuel processing problem by defining the power plant solely as a pure hydrogen fuel unit. Since gasoline is the most generally available fuel for vehicular use, a fuel cell power plant that can use gasoline, or similar commonly available vehicle fuels would be most desirable.

Since gasoline or similar fuels are preferred for vehicular applications, it is necessary to employ a fuel processing technique that can readily convert these fuels into a hydrogen-rich fuel stream while also lending itself to a light weight and compact design. An autothermal fuel processing unit, as described in U.S. Pat. No. 4,473,543, is such a device. It can operate in a temperature range which is suitable for processing gasoline and is also easily configured into a small compact unit which is suitable for vehicular use.

While gasoline is considered to be the fuel of choice, circumstances may warrant the use of other fuels such as natural gas, propane or methanol, for example. With these other fuels, the fuel processing system would continue to include an autothermal reformer because of size and weight benefits.

Therefore what is needed is a fuel cell power plant for vehicles that starts instantly and uses a fuel processing unit which is light weight, compact and capable of processing gasoline, or the like fuels which contain sulfur compounds. This would be highly desirable from an environmental viewpoint in the reduction of pollutants and a more efficient use of natural resources.

DISCLOSURE OF THE INVENTION

This invention relates to a fuel cell power plant system which is suitable for use in a mobile or aquatic vehicle, and which is capable of being instantly started up, and is capable of processing fuels such as gasoline, and other commonly available fuels which contain sulfur compounds. The invention can also process fuel supplies, such as methanol, which are sulfur-free, but which may become contaminated by sulfur during shipping or filling. The instant start-up systems of this invention can be incorporated into fuel processing systems described n commonly owned co-pending application for Letters Patent U.S. Ser. No. 09/104,254, filed Jun. 24, 1998, pending Jun. 26, 2000. Such instant start-up can be accomplished by having a system that incorporates on-board auxiliary fuel supplies for system operation during a start-up period, which auxiliary fuel supplies are sufficient to bring the fuel processing components up to system operating temperatures. When methanol is the fuel being processed, the system would not require a sulfur scrubber, but other components of the system would remain the same.

The system of this invention can include an auxiliary onboard fuel supply which allows the fuel cell CSA to operate, while the key elements of the fuel processing unit, i.e., the sulfur scrubber and the reformer are raised to their operating temperatures. This onboard fuel supply, which is typically hydrogen, can be regenerated during normal operation of the power plant since excess processed fuel is available during much of the vehicle driving cycle.

The system of the invention also includes a reformer unit, typically an autothermal reformer, which is designed to process fuels such as gasoline, or the like. The reformer can achieve its operating temperatures before the sulfur scrubber, so that the reformer fuel processing can be started first. This is accomplished by having an onboard supply of available fuel to operate the reformer while the sulfur scrubber continues its heat up process. The auxiliary fuel supply can be desulfurized gasoline supply which will be used so that the vehicle can operate on the auxiliary supply until the sulfur scrubber is operational, and the complete system starts to perform.

It is therefore an object of this invention to provide a system which is suitable for use in a mobile electrically-powered vehicle which is powered by electricity provided by a fuel cell power plant on the vehicle.

It is an additional object of this invention to provide a system of the character described wherein a raw hydrocarbon fuel stock is desuifurized to an extent needed to produce a gaseous fuel cell power plant-compatible fuel stream.

It is a further object of this invention to provide a system of the character described wherein the vehicle can be started by means of an auxiliary source of fuel suitable for use in the fuel cell power plant, without significant fuel processing.

These and other objects of the invention will become more readily apparent from the following detailed description thereof when taken in conjunction with the accompanying drawings in which:

SPECIFIC MODES FOR CARRYING OUT THE INVENTION

Figure 1:
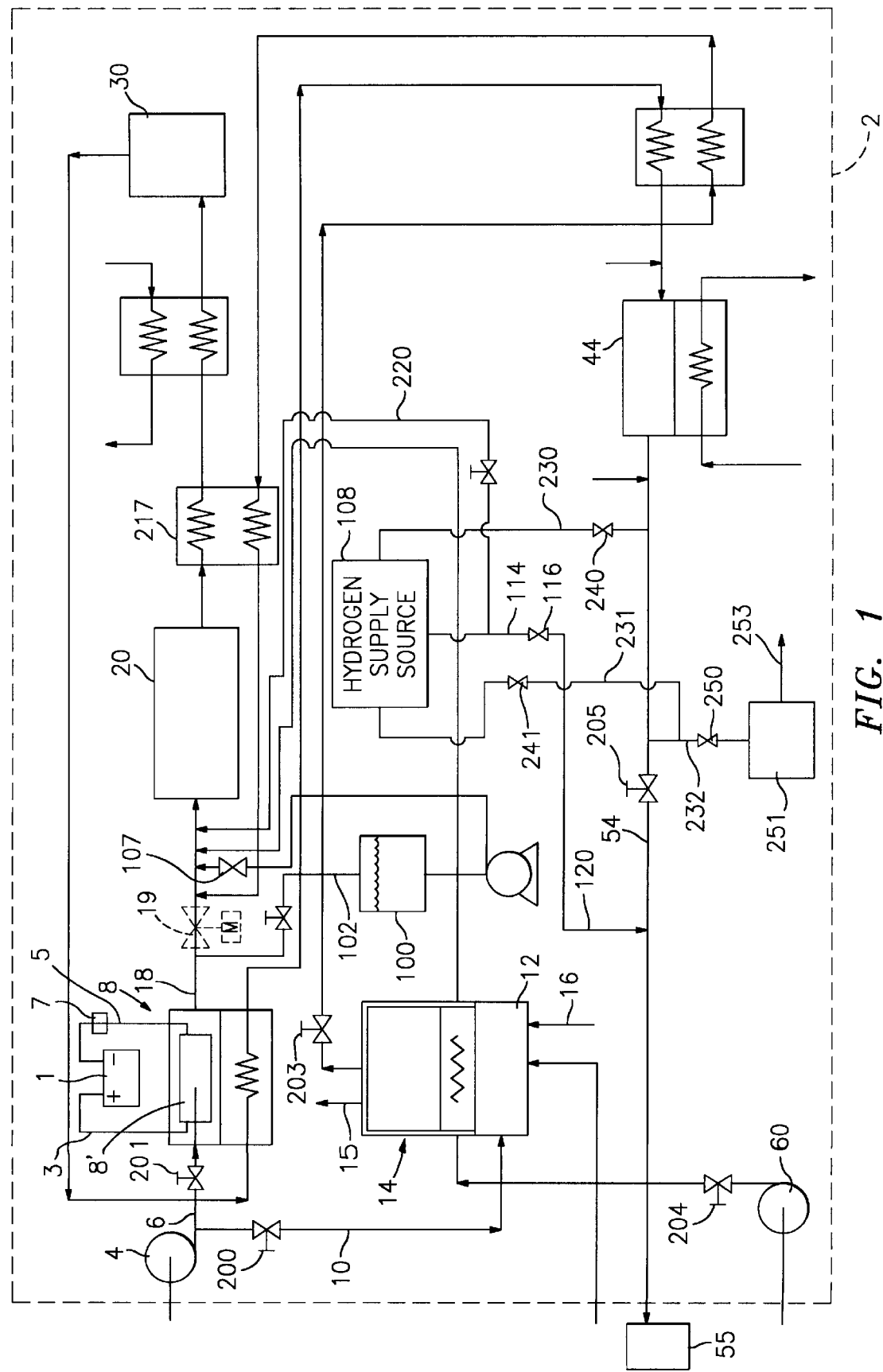
FIG. 1 is a schematic drawing of a fuel processing system designed for use in a vehicle which incorporates the instant start-up system of this invention.

Referring now to the drawing, FIG. 1 is a schematic view of a fuel processing system that is denoted generally by the numeral 2 and which is suitable for use in a vehicle such as an automobile. The fuel being processed, as noted above, can be gasoline, which shall be specifically referenced hereinafter as a preferred mode for practicing the invention. A fuel pump 4 pumps the gasoline into the system 2 via line 6 which leads to a nickel reactant desulfurizer bed 8. A branch line 10 is provided to bleed off a portion of the gasoline to feed a burner 12 in a boiler 14 which produces steam for the fuel processor system 2. Air enters the burner 12 through line 16. The burner exhaust exits from the system 2 via an exhaust line 15. In normal operation, the fuel flows from the desulfurizer bed 8 into the autothermal reformer 20 wherein the fuel is initially converted into a hydrogen-rich gas. From the reformer 20 the gas may pass through one or more heat exchangers and then to a shift converter 30 where the gas is further processed to increase the amount of hydrogen in the gas stream. Following the shift converter 30, the gas stream may again pass through various heat exchangers, and then to a selective oxidizer 44 having one or more beds, after which the gas flows to the CSA 55 via line 54.

The system 2 is provided with a reserve supply of fuel so as to enable the vehicle to be readily restarted after shut down of a previous operating cycle. In one embodiment, a start-up supply of desulfurized fuel is drawn off into a start-up fuel tank 100 during each operating cycle of the system 2. The start-up desulfurized reserve fuel supply is maintained in a liquid form in the tank 100. The valve 19 is employed in the line 18 to maintain the liquid phase of the fuel in the desulfurizer 8. The liquid desulfurized fuel reserve is drawn into the tank 100 through a branch line 102 which communicates with the line 18 upstream of the valve 19. Thus the reserve supply 100 of desulfurized fuel can be used to operate the reformer 20 on a temporary basis, after the reformer 20 is at its operating temperature and until the desulfurizer 8 has reached its operating temperature.

For an instant response start-up of the power plant, an additional, or supplemental start-up sub-assembly may also be incorporated into the system. This additional sub-assembly includes a hydrogen supply source 108, which could be a pressurized tank or a hydride bed containing hydrogen. The hydrogen supply source is connected to an outlet line 114 which leads to line 120 that is connected to the line 54. Valve 116 controls the passage of hydrogen through the line 120 so that hydrogen can be selectively fed to the fuel cell stack assembly 55 to operate the latter during start up of the vehicle until the system 2 is brought to operating temperature by any of the systems described in this application. Hydrogen can also be fed from the supply source 108 to the reformer 20 through line 220. The hydrogen supply can be replenished during power plant operation by manipulating valves 240 and 241 in lines 230 and 231. The reformer heat up could be accomplished by several methods such as a gasoline and air fired heat exchanger as shown in FIG. 2, or by directly supplying hydrogen and air to the system, as described in FIG. 1.

Figure 2:
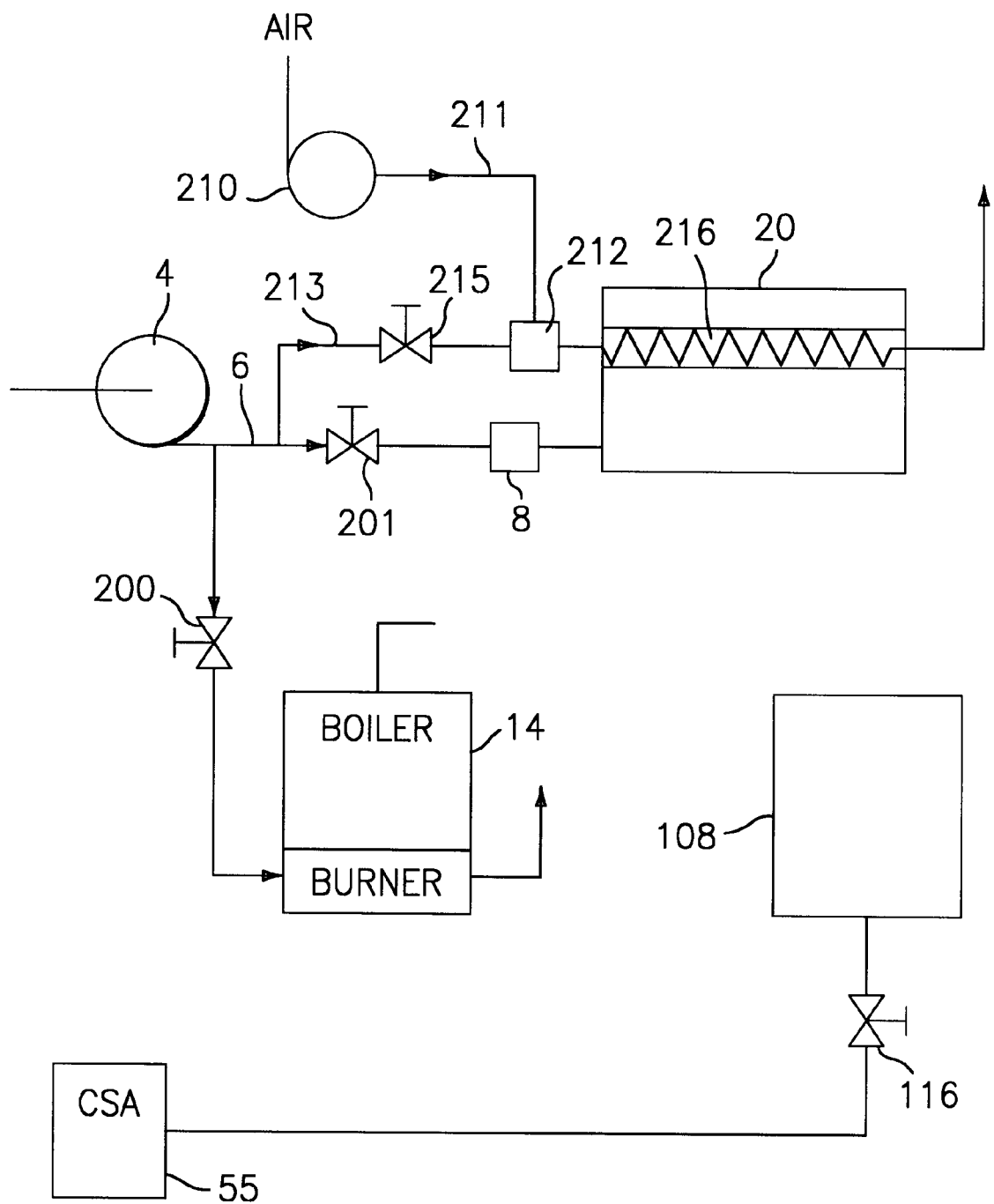
FIG. 2 is an embodiment of the system of this invention which operates the cell stack assembly with hydrogen until the reformer is brought up to operating temperatures.

FIG. 2 shows a sub-system which can be used to bring the reformer 20 to operating temperature while the cell stack assembly 55 is being operated with hydrogen from the tank 108 during start up. A pump 210 is provided for pumping ambient air into a line 211 leading to a burner 212. The fuel pump 4 is selectively operable through opening of a valve 215 to pump raw gasoline through line 213 to the burner 212 wherein the gasoline and air are burned to produce a hot gas that is directed into a heat exchanger 216 in the autothermal reformer 20. The flow of heated gas through the heat exchanger is continued until the autothermal reformer 20 reaches an initial temperature of about 450° F. At the same time, the valve 201 remains closed and the valve 200 is opened so as to fire up the boiler 14 while preventing the flow of raw co gasoline to the reformer 20.

Once the reformer temperature is at about 450° F., as seen in FIG. 1, heat to the reformer 20 is continuously generated by a combination of steam from the boiler 14 via valve 203, and air via valve 204, and by desulfurized fuel via valve 107 while the fuel cell stack 55 continues operating from the $H_2$ supply. The effluent from the reformer 20 is then fed to the other components in the fuel processing system in order to bring them up to operating temperature. The effluent vents from the power plant through line 232, which is controlled by valve 250, and passes into a catalytic burner 251, from which the effluent is exhausted into the ambient atmosphere through line 253. This transient state continues until the shift converter 30 is at an operating temperature of about 300–450° F.

As the shift converter 30 reaches a temperature of about 300–450° F., the fuel processing system 2 moves to the next transient state. The $H_2$ fuel supply to the fuel cell 55 is replaced by output from the system 2 by opening the valve 205 and by closing the valve 116. This transient state continues until the desulfurizer reaches a temperature of about 350° F. Once that temperature is reached, the desulfurized fuel supply is shut off by closing valve 107 while the raw fuel supply is started by opening valve 201. At this point in time, the entire system is in operation.

Figure 3:
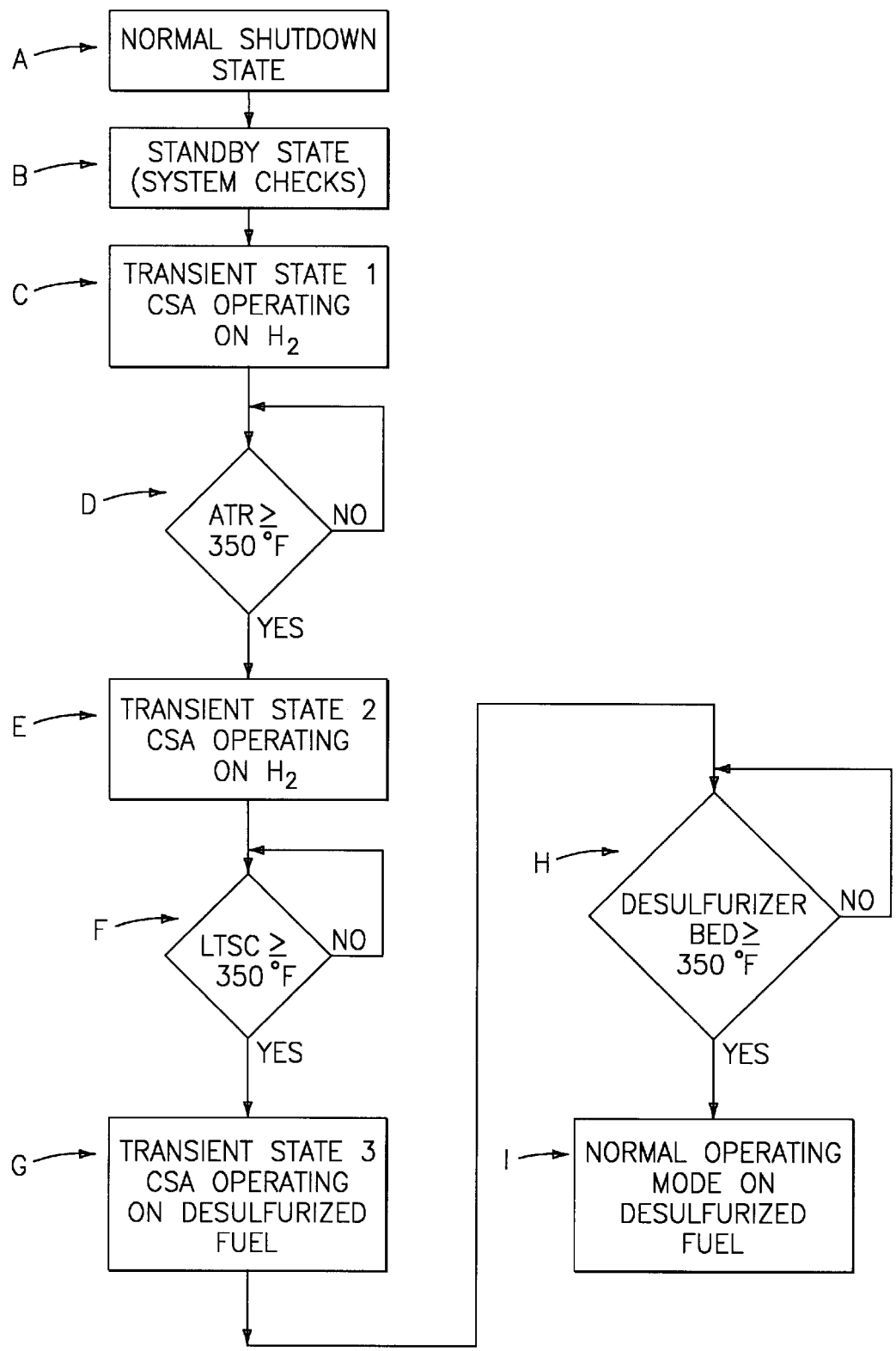
FIG. 3 is a software flow chart indicating the mode of operation of the various valves used in the instant start-up system of this invention.

Referring now to FIG. 3, there is shown the start up operational program by which the system controller operates the system. It will be noted that Block A represents the shutdown state of the power plant including the cell stack assembly and of the fuel processing system. In Block B, the system has been alerted that a power plant start-up is imminent. Block C shows the initiation of transient state 1 where the cell stack assembly 55 is supplied with hydrogen from source 108 while the boiler 14 and reformer start-burner 12 begin operation. State 1 is initiated as noted in Block C by opening the valves 116, 200 and 215 and starting blower 210 so as to supply the boiler burner 12 with fuel, and to supply the air and fuel to the reformer burner 20 which heats the reformer 20 through the reformer start-up HEX 216. Exhaust gas from the HEX 216 can be used to heat the steam superheater HEX 217 by flowing the exhaust gas through the superheater HEX 217. Transient state 1 is continued until the autothermal reformer 20 has reached a temperature of about 350° F., as noted by Block D.

Block E shows the initiation of transient state 2. In this state, the cell stack assembly 55 continues to be supplied with hydrogen from source 108 while steam from the boiler 14, air from a blower 60, and desulfurized fuel from the tank 100 begin flowing into the reformer by opening valves 107, 203 and 204. At the same time, valve 215 closes to stop the flow of raw fuel to the reformer burner 212 through line 213. The exhaust from the autothermal reformer 20 continues through the remaining fuel processing system components in order to heat them to operating temperature. Transient state 2 is continued until the shift converter has reached a temperature of about 350° F., as noted by Block F.

Block G shows the initiation of transient state 3. In this state, the cell stack assembly 55 is switched from the $H_2$ supply source 108 to operation on the output from the fuel processing system 2. The switch is made by opening valve 205 and closing valves 116 and 250. Transient state 3 is continued until the desulfurizer 8 has reached a temperature of about 350° F., as noted by Block H.

Block I shows the initiation of the normal operating mode wherein the fuel processing system 2 is switched from the desuffurized fuel supply to the raw fuel supply. This is accomplished by opening valve 201 and closing valve 107. The normal state of operation remains in effect until the next shut down cycle begins.

Figure 4:
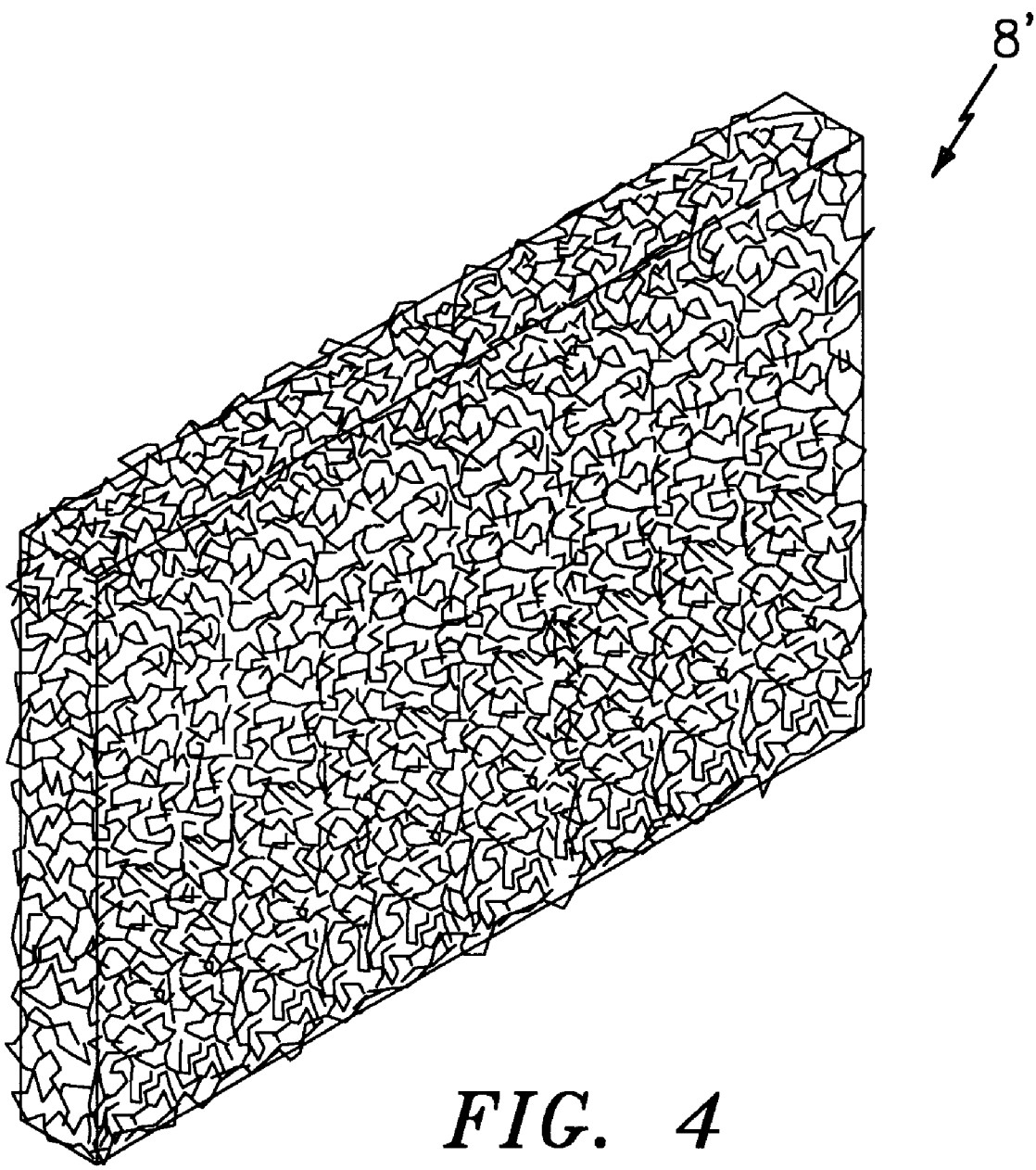
FIG. 4 is a perspective view of an embodiment of a sulfur scrubber bed which is compact and very light weight while providing optimal reactant surface area.

Referring to FIG. 4, there is shown an embodiment of a sulfur scrubber reactant bed component 8' which takes the form of a monolithic open-cell sponge or foam formed from a material such as aluminum, copper, or ceramic which can be coated with a nickel reactant that will remove sulfur from a fluid passing through the component 8. The component 8' is formed by immersing or spraying the wash coated open cell sponge component 8' so as to form a high surface area nickel reactant layer.

The result is a compact light, weight, porous monolithic structure having interstices which are coated with the nickel reactant. This structure provides a high nickel-coated surface area with minimum weight and minimum size. This structure is much more desirable that nickel doped carbon pellets formed from nickel doped carbon powder, since most of the nickel in the doped powder is contained inside of the pellets and will not encounter the sulfur-contaminated fluid which passes through the pellet bed. Suitable monolithic aluminum foam cores can be obtained from Energy Research and Generation, Inc. of Oakland, Calif. When the desulfurizer bed 8 is formed from the aforesaid nickel-coated monolithic foam component 8', the temperature of the desulfurizer bed 8 can be brought up to operational levels by passing an electrical current through the component 8' and relying on current flow resistance. After system operating temperatures are stabilized, the electrical current is turned off. Referring back to FIG. 1, there is shown a subassembly for supplying the aforesaid heating current to the component 8'. The subassembly includes the vehicle battery 1 which is connected to the component 8' by means of lines 3 and 5. A switch 7 selectively controls the flow of current through the component 8'.

It will be readily appreciated that the start up system of this invention will enable rapid start up of a power plant from a dormant state, so as to allow the cell stack assembly to supply electrical power to an electric motor in a vehicle. The start up supply of hydrogen and/or desulfurized fuel can be periodically recharged during operation of the vehicle.

Since many changes and variations of the disclosed embodiment of the invention may be made without departing from the inventive concept, it is not intended to limit the invention otherwise than as required by the appended claims.

What is claimed is:

1. A system for implementing start-up of a vehicle that is powered by electricity derived from an onboard fuel cell power plant, said system including:
    a) a source of a hydrocarbon fuel on said vehicle which contains organic sulfur compounds, said fuel serving as a hydrogen source for the fuel cell power plant during use of the vehicle;
    b) a nickel reactant desulfurizer station on said vehicle which is operable to treat an undiluted stream of said hydrocarbon fuel so as to convert essentially all of the sulfur in said organic sulfur compounds to nickel sulfide thereby creating a substantially sulfur-free hydrocarbon fuel;
    c) first means on said vehicle for reforming the sulfur-free hydrocarbon fuel to provide a hydrogen-enriched gaseous fuel stream;
    d) second means on said vehicle for converting carbon monoxide and water in said hydrogen-enriched gaseous fuel stream to carbon dioxide and hydrogen;
    e) third means on said vehicle for converting carbon monoxide and oxygen from said hydrogen-enriched gaseous fuel stream to carbon dioxide; and
    f) an auxiliary fuel supply on said vehicle for use in temporarily operating said fuel cell power plant during start-up of said vehicle.

2. The system of claim 1 wherein said auxiliary fuel supply is a supply of hydrogen.

3. The system of claim 1 wherein said auxiliary fuel supply includes a choice of desuffurized hydrocarbon fuel and hydrogen.

4. The system of claim 1 wherein said auxiliary fuel supply is a supply of desulfurized hydrocarbon fuel.

5. A method for implementing start-up of a vehicle that is powered by electricity derived from an onboard fuel cell power plant, said method comprising:
    a) a first step of providing a source of a hydrocarbon fuel on said vehicle which contains organic sulfur compounds, said fuel serving as a hydrogen source for the fuel cell power plant during use of the vehicle;
    b) a second step of providing a nickel reactant desulfurizer station on said vehicle which is operable to treat an undiluted stream of said hydrocarbon fuel so as to convert essentially all of the sulfur in said organic sulfur compounds to nickel sulfide thereby creating a substantially sulfur-free hydrocarbon fuel;
    c) a third step of reforming the sulfur-free hydrocarbon fuel to provide a hydrogenen-riched gaseous fuel stream;
    d) a fourth step of converting carbon monoxide in said hydrogen-enriched gaseous fuel stream to carbon dioxide; and
    e) a fifth step of providing an auxiliary fuel supply on said vehicle for use in temporarily operating said fuel cell power plant during start-up of said vehicle.

6. The method of claim 5 wherein said auxiliary fuel supply is a supply of hydrogen.

7. The method of claim 5 wherein said auxiliary fuel supply includes a choice of desulfurized hydrocarbon fuel and hydrogen.

8. The method of claim 5 wherein said auxiliary fuel supply is a supply of desulfurized hydrocarbon fuel.

9. A system for implementing start-up of a vehicle that is powered by electricity derived from an onboard fuel cell power plant, said system including:
   a) a source of a sulfur-free hydrocarbon fuel on said vehicle, said fuel serving as a hydrogen source for the fuel cell power plant during use of the vehicle;
   b) first means on said vehicle for reforming the sulfur-free hydrocarbon fuel to provide a hydrogen-enriched gaseous fuel stream;
   c) second means on said vehicle for converting carbon monoxide and water in said hydrogen-enriched gaseous fuel stream to carbon dioxide and hydrogen;
   d) third means on said vehicle for converting carbon monoxide and oxygen from said hydrogen-enriched gaseous fuel stream to carbon dioxide; and
   e) an auxiliary fuel supply on said vehicle for use in temporarily operating said fuel cell power plant during start-up of said vehicle.

10. The system of claim 9 wherein said auxiliary fuel supply is a supply of hydrogen.

11. The system of claim 9 wherein said sulfur-free hydrocarbon fuel is methanol.

12. The system of claim 9 wherein said source of sulfur-free hydrocarbon fuel includes a nickel reactant sulfur scrubbing bed which is operable to convert organic sulfur compounds in gasoline or diesel fuel to nickel sulfide.

13. The system of claim 12 further comprising electrical means for heating said sulfur scrubbing bed to operating temperatures of about 350° F.

\* \* \* \* \*